United States Patent
Devarappalli et al.

(10) Patent No.: US 9,471,234 B2
(45) Date of Patent: *Oct. 18, 2016

(54) SYSTEMS AND METHODS FOR MIRRORING VIRTUAL FUNCTIONS IN A CHASSIS CONFIGURED TO RECEIVE A PLURALITY OF MODULAR INFORMATION HANDLING SYSTEMS AND A PLURALITY OF MODULAR INFORMATION HANDLING RESOURCES

(71) Applicant: Dell Products L.P., Round Rock, TX (US)

(72) Inventors: Kiran Kumar Devarappalli, Bangalore (IN); Krishnaprasad Koladi, Bangalore (IN)

(73) Assignee: Dell Products L.P., Round Rock, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/875,866

(22) Filed: Oct. 6, 2015

(65) Prior Publication Data

US 2016/0034213 A1 Feb. 4, 2016

Related U.S. Application Data

(63) Continuation of application No. 13/751,291, filed on Jan. 28, 2013, now Pat. No. 9,195,483.

(51) Int. Cl.
*G06F 3/00* (2006.01)
*G06F 13/00* (2006.01)
(Continued)

(52) U.S. Cl.
CPC ............ *G06F 3/0619* (2013.01); *G06F 3/065* (2013.01); *G06F 3/0665* (2013.01);
(Continued)

(58) Field of Classification Search
CPC .. G06F 11/2273; G06F 11/263; G06F 11/20; G06F 12/02; G06F 13/00; G06F 15/173; G06F 11/3006; G06F 11/3044; G06F 11/3048; G06F 13/14; G06F 13/4004; G06F 13/42; G06F 15/16; G06F 15/177; G06F 1/28; G06F 1/3206; G06F 1/3209
USPC ............ 710/3, 31, 33, 38, 51, 100; 709/231; 714/6.3; 370/409; 711/114, 162
See application file for complete search history.

(56) References Cited

U.S. PATENT DOCUMENTS

| 5,668,943 A | 9/1997 | Attanasio et al. |
| 5,930,259 A | 7/1999 | Katsube et al. |

(Continued)

OTHER PUBLICATIONS

International Patent Application No. PCT/US2013/046957, International Search Report and Written Opinion, mailed Jan. 17, 2014, 8 pages.

*Primary Examiner* — Farley Abad
*Assistant Examiner* — Henry Yu
(74) *Attorney, Agent, or Firm* — Jackson Walker L.L.P.

(57) ABSTRACT

A method may include, in a chassis configured to receive a plurality of modular information handling systems and a plurality of modular information handling resources, exposing a first virtual function instantiated on a management processor disposed in the chassis to a switch interfaced between a modular information handling system and the management processor. The method may also include communicating, by the management processor, an input/output request from the modular information handling system received by the first virtual function to at least one of a second virtual function instantiated on a first storage controller communicatively coupled to the management processor and a third virtual function instantiated on a second storage controller communicatively coupled to the management processor. The method may further include receiving, by the management processor, an acknowledgment of completion of the input/output request from at least one of the second virtual function and the third virtual function.

20 Claims, 3 Drawing Sheets

(51) Int. Cl.
*G06F 5/00* (2006.01)
*G06F 15/16* (2006.01)
*G06F 11/16* (2006.01)
*G06F 3/06* (2006.01)
*G06F 9/455* (2006.01)
*H04L 29/06* (2006.01)
*G06F 13/40* (2006.01)
*G06F 13/42* (2006.01)
*H04L 29/08* (2006.01)
*H04L 29/14* (2006.01)

(52) U.S. Cl.
CPC ............ *G06F 3/0689* (2013.01); *G06F 9/455* (2013.01); *G06F 13/4022* (2013.01); *G06F 13/4282* (2013.01); *H04L 67/38* (2013.01); *G06F 2009/45595* (2013.01); *H04L 67/1095* (2013.01); *H04L 67/1097* (2013.01); *H04L 69/40* (2013.01); *H04Q 2213/1302* (2013.01); *H04Q 2213/1304* (2013.01); *H04Q 2213/13106* (2013.01); *H04Q 2213/13166* (2013.01)

(56) References Cited

U.S. PATENT DOCUMENTS

| | | |
|---|---|---|
| 7,299,290 B2 | 11/2007 | Karpoff |
| 7,386,694 B1 | 6/2008 | Bezbaruah et al. |
| 7,388,861 B2 | 6/2008 | Betker et al. |
| 7,765,347 B2 | 7/2010 | King et al. |
| 7,930,377 B2 | 4/2011 | Shah et al. |
| 7,979,592 B1 | 7/2011 | Pettey et al. |
| 8,321,722 B2 | 11/2012 | Tanaka et al. |
| 2006/0143422 A1 | 6/2006 | Mashima et al. |
| 2008/0222356 A1 | 9/2008 | Mimatsu et al. |
| 2011/0022812 A1 | 1/2011 | Van Der Linden et al. |
| 2012/0063304 A1 | 3/2012 | Gnanasekaran et al. |
| 2012/0180048 A1 | 7/2012 | Brownlow et al. |
| 2013/0086583 A1 | 4/2013 | Uemura et al. |
| 2013/0174155 A1 | 7/2013 | Yang et al. |

| INFORMATION HANDLING SYSTEM 102 |  |
|---|---|
| SWITCH 110 | |
| MANAGEMENT PROCESSOR VIRTUAL FUNCTION 248 | |
| STORAGE CONTROLLER VIRTUAL FUNCTION 114 | DEVICE VIRTUAL FUNCTION 236 |
| STORAGE CONTROLLER 114 | DEVICE 236 |

| INFORMATION HANDLING SYSTEM 102 | |
|---|---|
| SWITCH 110 | |
| MANAGEMENT PROCESSOR VIRTUAL FUNCTION 248 | |
| STORAGE CONTROLLER VIRTUAL FUNCTION 114 | STORAGE CONTROLLER VIRTUAL FUNCTION 114 |
| STORAGE CONTROLLER 114 | STORAGE CONTROLLER 114 |

SYSTEMS AND METHODS FOR MIRRORING VIRTUAL FUNCTIONS IN A CHASSIS CONFIGURED TO RECEIVE A PLURALITY OF MODULAR INFORMATION HANDLING SYSTEMS AND A PLURALITY OF MODULAR INFORMATION HANDLING RESOURCES

The present patent application is a continuation of a previously filed patent application, U.S. patent application Ser. No. 13/751,291, filed Jan. 28, 2013, the entirety of which is hereby incorporated by reference.

TECHNICAL FIELD

The present disclosure relates in general to information handling systems, and more particularly to operation of virtual functions related to modular information handling resources in a chassis.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Existing server architectures either provide a single monolithic server capable of running one operating system (or a single hypervisor running multiple virtualized operating systems) and input/output ("I/O") resources at a time, or bulky blade server chassis providing multiple servers and I/O control modules in a single chassis. A system chassis with multiple information handling systems with various peripheral and I/O capabilities common to the chassis as a whole may provide advantages, as it allows a blade server chassis in a small form factor, thereby providing a blade server chassis with a size comparable to the size of a monolithic server. Implementation of a system chassis with multiple information handling systems with various peripheral and I/O capabilities common to the chassis as a whole presents numerous challenges.

SUMMARY

In accordance with the teachings of the present disclosure, the disadvantages and problems associated with mirroring virtual functions have been reduced or eliminated.

In accordance with embodiments of the present disclosure, a system may include a chassis and a management processor. The chassis may be configured to receive a plurality of modular information handling systems and a plurality of modular information handling resources. The management processor may be disposed in the chassis and configured to be communicatively coupled to modular information handling systems received in the chassis and further configured to. The management processor may also be configured to expose a first virtual function instantiated on the management processor to a switch interfaced between a modular information handling system and the management processor. The management processor may additionally be configured to communicate an input/output request from the modular information handling system received by the first virtual function to at least one of a second virtual function instantiated on a first storage controller communicatively coupled to the management processor and a third virtual function instantiated on a second storage controller communicatively coupled to the management processor. The management processor may further be configured to receive an acknowledgment of completion of the input/output request from at least one of the second virtual function and the third virtual function. The management processor may also be configured to communicate the acknowledgement to the information handling system via the switch and the first virtual function.

In accordance with these and other embodiments of the present disclosure, a method may include, in a chassis configured to receive a plurality of modular information handling systems and a plurality of modular information handling resources, exposing a first virtual function instantiated on a management processor disposed in the chassis to a switch interfaced between a modular information handling system and the management processor. The method may also include communicating, by the management processor, an input/output request from the modular information handling system received by the first virtual function to at least one of a second virtual function instantiated on a first storage controller communicatively coupled to the management processor and a third virtual function instantiated on a second storage controller communicatively coupled to the management processor. The method may further include receiving, by the management processor, an acknowledgment of completion of the input/output request from at least one of the second virtual function and the third virtual function. The method may additionally include communicating, by the management processor, the acknowledgement to the information handling system via the switch and the first virtual function.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates a virtual stack for I/O communication between an information handling system and target storage controllers, in accordance with embodiments of the present disclosure; and FIG. 4 illustrates another virtual stack for I/O communication between an information handling system and target storage controllers, in accordance with embodiments of the present disclosure.

DETAILED DESCRIPTION

Figure 1:
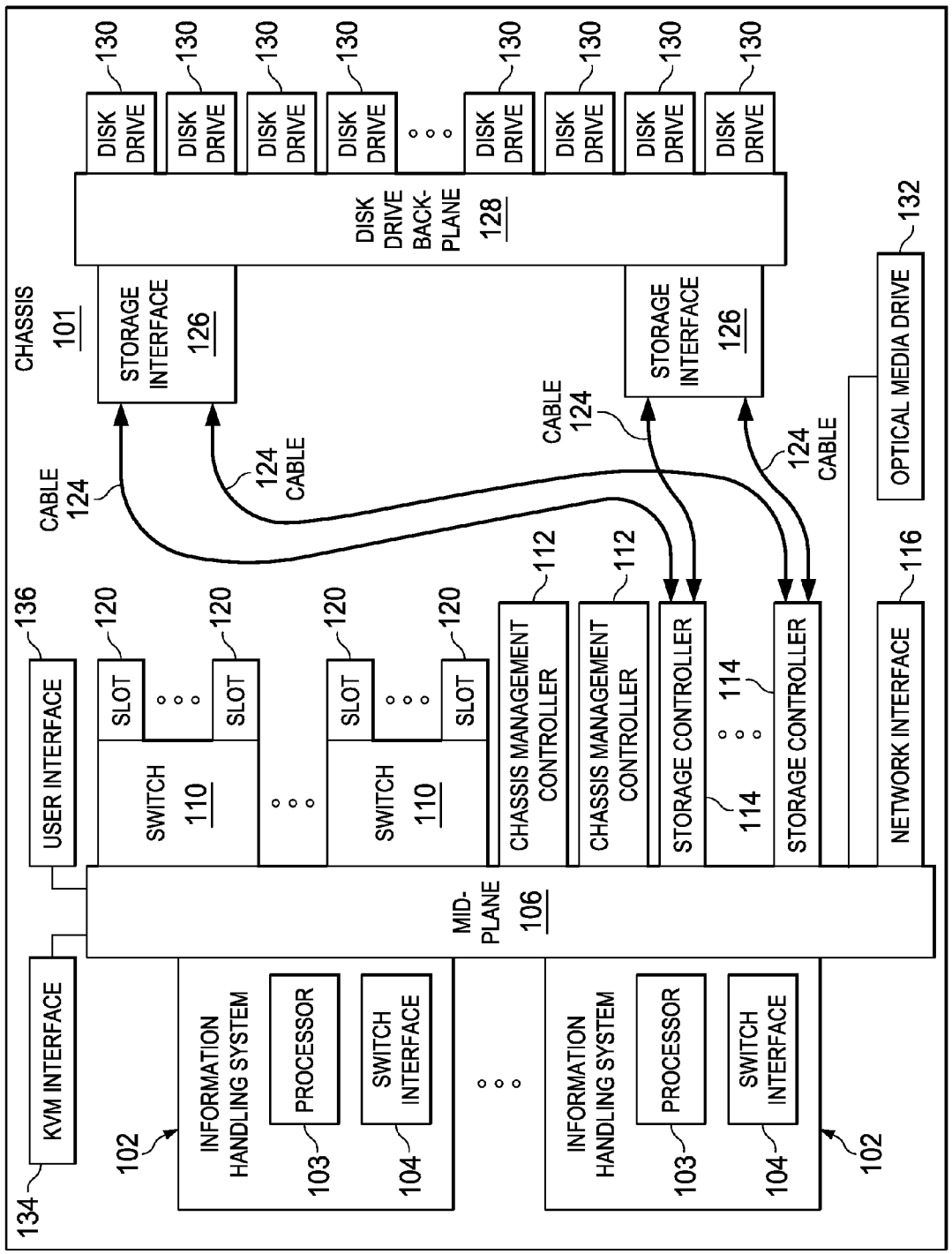
FIG. 1 illustrates a block diagram of an example system chassis with multiple information handling systems and with various peripheral and I/O capabilities common to the chassis as a whole, in accordance with embodiments of the present disclosure.

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various I/O devices, such as a keyboard, a mouse, and a video display. The information handling system may also include one or more busses operable to transmit communication between the various hardware components.

For the purposes of this disclosure, information handling resources may broadly refer to any component system, device or apparatus of an information handling system, including without limitation processors, busses, memories, I/O devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/ or flash memory; as well as communications media such as wires, optical fibers, microwaves, radio waves, and other electromagnetic and/or optical carriers; and/or any combination of the foregoing.

Information handling systems often use an array of physical storage resources (e.g., disk drives), such as a Redundant Array of Independent Disks ("RAID"), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a chassis, to hundreds of physical storage resources disposed in one or more separate storage enclosures.

FIG. 1 illustrates a block diagram of an example system 100 having a chassis 101 with multiple information handling systems 102 and with various peripheral and I/O capabilities common to chassis 101 as a whole, in accordance with embodiments of the present disclosure. As depicted in FIG. 1, system 100 may comprise a chassis 101 including a plurality of information handling systems 102, a mid-plane 106, one or more switches 110, one or more chassis management controllers 112, a network interface 116, one or more slots 120, one or more cables 124, one or more storage interfaces 126, a disk drive backplane 128, a plurality of disk drives 130, an optical media drive 132, a keyboard-video-mouse ("KVM") interface 134, and a user interface 136.

An information handling system 102 may generally be operable to receive data from and/or communicate data to one or more disk drives 130 and/or other information handling resources of chassis 101 via mid-plane 106 and/or switches 110. In certain embodiments, an information handling system 102 may be a server. In such embodiments, an information handling system may comprise a blade server having modular physical design. In these and other embodiments, an information handling system 102 may comprise an M class server. As depicted in FIG. 1, an information handling system 102 may include a processor 103 and one or more switch interfaces 104 communicatively coupled to processor 103.

A processor 103 may include any system, device, or apparatus configured to interpret and/or execute program instructions and/or process data, and may include, without limitation, a microprocessor, microcontroller, digital signal processor ("DSP"), application specific integrated circuit ("ASIC"), or any other digital or analog circuitry configured to interpret and/or execute program instructions and/or process data. In some embodiments, processor 103 may interpret and/or execute program instructions and/or process data stored in a memory, a disk drive 130, and/or another component of system 100.

A switch interface 104 may comprise any system, device, or apparatus configured to provide an interface between its associated information handling system 102 and switches 110. In some embodiments, switches 110 may comprise Peripheral Component Interconnect Express ("PCIe") switches, in which case a switch interface 104 may comprise a switch card configured to create a PCIe-compliant interface between its associated information handling system 102 and switches 110. In other embodiments, a switch interface 104 may comprise an interposer. Use of switch interfaces 104 in information handling systems 102 may allow for minimal changes to be made to traditional servers (e.g., M class servers) while supporting the overall system architecture disclosed herein. Although FIG. 1 depicts an implementation including a single switch interface 104 per information handling system 102, in some embodiments each information handling system 102 may include a plurality of switch interfaces 104 for redundancy, high availability, and/or other reasons.

Mid-plane 106 may comprise any system, device, or apparatus configured to interconnect modular information handling systems 102 with information handling resources. Accordingly, mid-plane 106 may include slots and/or connectors configured to receive information handling systems 102, switches 110, chassis management controllers 112, storage controllers 114, network interface 116, optical media drive 132, KVM interface 134, user interface 136, and/or other information handling resources. In one embodiment, mid-plane 106 may include a single board configured to interconnect modular information handling systems 102 with information handling resources. In another embodiment, mid-plane 106 may include multiple boards configured to interconnect modular information handling systems 102 with information handling resources. In yet another embodiment, mid-plane 106 may include cabling configured to interconnect modular information handling systems 102 with information handling resources.

A switch 110 may comprise any system, device, or apparatus configured to couple information handling systems 102 to storage controllers 114 (e.g., via mid-plane 106) and slots 120 and perform switching between information handling systems 102 and various information handling resources of system 100, including storage controllers 114 and slots 120. In certain embodiments, a switch 110 may comprise a PCIe switch. In other embodiments, a switch may comprise a generalized PC bus switch, an Infiniband switch, or other suitable switch. As shown in FIG. 1, chassis 101 may include a plurality of switches 110. In such embodiments, switches 110 may operate in a redundant mode for shared devices (e.g., storage controllers 114 and/or devices coupled to slots 120) and in non-redundant mode for non-shared/zoned devices. As used herein, shared devices may refer to those which may be visible to more than one information handling system 102, while non-shared devices may refer to those which are visible to only a single information handling system 102. In some embodiments, mid-plane 106 may include a single switch 110.

A chassis management controller 112 may be any system, device, or apparatus configured to facilitate management and/or control of system 100, its information handling systems 102, and/or one or more of its component information handling resources. A chassis management controller 112 may be configured to issue commands and/or other signals to manage and/or control information handling system 102 and/or information handling resources of system 100. A chassis management controller 112 may comprise a microprocessor, microcontroller, DSP, ASIC, field programmable gate array ("FPGA"), EEPROM, or any combination thereof. As shown in FIG. 1, a chassis management controller 112 may be coupled to mid-plane 106. Also as shown in FIG. 1, system 100 may include a plurality of chassis management controllers 112, and in such embodiments, chassis management controllers 112 may be configured as redundant. In some embodiments, a chassis management controller 112 may provide a user interface and high level controls for management of switches 110, including configuring assignments of individual information handling systems 102 to non-shared information handling resources of system 100. In these and other embodiments, a chassis management controller may define configurations of the storage subsystem (e.g., storage controllers 114, storage interfaces 126, disk drives 130, etc.) of system 100. For example, a chassis management controller may provide physical function configuration and status information that would normally occur at the driver level in traditional server implementations. Examples of physical functions include disk drive discovery and status, RAID configuration and logical volume mapping.

In addition or alternatively, a chassis management controller 112 may also provide a management console for user/administrator access to these functions. For example, a chassis management controller 112 may implement Web Services Management ("WS-MAN") or another suitable management protocol permitting a user to remotely access a chassis management controller 112 to configure system 100 and its various information handling resources. In such embodiments, a chassis management controller 112 may interface with a network interface separate from network interface 116, thus allowing for "out-of-band" control of system 100, such that communications to and from chassis management controller 112 are communicated via a management channel physically isolated from an "in-band" communication channel with network interface 116. Thus, for example, if a failure occurs in system 100 that prevents an administrator from interfacing with system 100 via network interface 116 and/or user interface 136 (e.g., operating system failure, power failure, etc.), the administrator may still be able to monitor and/or manage system 100 (e.g., to diagnose problems that may have caused failure) via a chassis management controller 112. In the same or alternative embodiments, chassis management controller 112 may allow an administrator to remotely manage one or more parameters associated with operation of system 100 and its various information handling resources (e.g., power usage, processor allocation, memory allocation, security privileges, etc.). Although FIG. 1 depicts chassis 101 as having two chassis management controllers 112, chassis 101 may include any suitable number of chassis management controllers 112.

A storage controller 114 may include any system, apparatus, or device operable to manage the communication of data between one or more of information handling systems 102 and one or more of disk drives 130. In certain embodiments, a storage controller 114 may provide functionality including, without limitation, disk aggregation and redundancy (e.g., RAID), I/O routing, and error detection and recovery. As shown in FIG. 1, a storage controller 114 may be coupled to a connector on a switch 110. Also as shown in FIG. 1, system 100 may include a plurality of storage controllers 114, and in such embodiments, storage controllers 114 may be configured as redundant. In addition or in the alternative, storage controllers 114 may in some embodiments be shared among two or more information handling systems 102. As also shown in FIG. 1, each storage controller 114 may be coupled to one or more storage interfaces 126 via cables 124. For example, in some embodiments, each storage controller 114 may be coupled to a single associated storage interface 126 via a cable 124. In other embodiments, each storage controller 114 may be coupled to two or more storage interfaces 126 via a plurality of cables 124, thus permitting redundancy as shown in FIG. 1. Storage controllers 114 may also have features supporting shared storage and high availability. For example, in PCIe implementations, a unique PCIe identifier may be used to indicate shared storage capability and compatibility in system 100.

As depicted in FIG. 1, switch 110 may have coupled thereto one or more slots 120. A slot 120 may include any system, device, or apparatus configured to allow addition of one or more expansion cards to chassis 101 in order to electrically couple such expansion cards to a switch 110. Such slots 120 may comprise any suitable combination of full-height risers, full-height slots, and low-profile slots. A full-height riser may include any system, device, or apparatus configured to allow addition of one or more expansion cards (e.g., a full-height slot) having a physical profile or form factor with dimensions that practically prevent such expansion cards to be coupled in a particular manner (e.g., perpendicularly) to mid-plane 106 and/or switch 110 (e.g., the proximity of information handling resources in chassis 101 prevents physical placement of an expansion card in such a manner). Accordingly, a full-height riser may itself physically couple with a low-profile to mid-plane 106, a switch 110, or another component, and full-height cards may then be coupled to full-height slots of a full-height riser. On the other hand, low-profile slots may be configured to couple low-profile expansion cards to switches 110 without the need for a full-height riser.

Slots 120 may also include electrically conductive elements (e.g., edge connectors, traces, etc.) allowing for expansion cards inserted into slots 120 to be electrically coupled to switches 110. In operation, switches 110 may manage switching of communications between individual information handling systems 102 and expansion cards coupled to slots 120. In some embodiments, slots 120 may be nonshared (e.g., each slot 120 is associated with a single information handling system 102). In other embodiments, one or more of slots 120 may be shared among two or more information handling systems 102. In these and other embodiments, one or more slots 120 may be configured to be compatible with PCIe, generalized PC bus switch, Infiniband, or other suitable communication specification, standard, or protocol.

Network interface 116 may include any suitable system, apparatus, or device operable to serve as an interface between chassis 101 and an external network (e.g., a local area network or other network). Network interface 116 may enable information handling systems 102 to communicate with the external network using any suitable transmission protocol (e.g., TCP/IP) and/or standard (e.g., IEEE 802.11, Wi-Fi). In certain embodiments, network interface 116 may include a network interface card ("NIC"). In the same or alternative embodiments, network interface 116 may be configured to communicate via wireless transmissions. In the same or alternative embodiments, network interface 116 may provide physical access to a networking medium and/or provide a low-level addressing system (e.g., through the use of Media Access Control addresses). In some embodiments, network interface 116 may be implemented as a local area network ("LAN") on motherboard ("LOM") interface.

In some embodiments, various components of chassis 101 may be coupled to a planar. For example, a planar may interconnect switches 110, chassis management controller 112, storage controllers 114, network interface 116, optical media drive 132, KVM interface 134, user interface 136, and/or other modular information handling resources of chassis 101 to mid-plane 106 of system 100. Accordingly, such planar may include slots and/or connectors configured to interconnect with such information handling resources.

Storage interfaces 126 may include any system, device, or apparatus configured to facilitate communication between storage controllers 114 and disk drives 130. For example, a storage interface may serve to permit a relatively small number of communication links (e.g., two) between storage controllers 114 and storage interfaces 126 to communicate with a greater number (e.g., 25) of disk drives 130. Thus, a storage interface 126 may provide a switching mechanism and/or disk drive addressing mechanism that allows an information handling system 102 to communicate with numerous disk drives 130 via a limited number of communication links and/or channels. Accordingly, a storage interface 126 may operate like an Ethernet hub or network switch that allows multiple systems to be coupled using a single switch port (or relatively few switch ports). A storage interface 126 may be implemented as an expander (e.g., a Serial Attached SCSI ("SAS") expander), an Ethernet switch, a FibreChannel switch, an Internet Small Computer System Interface (iSCSI) switch, or any other suitable switch. In order to support high availability storage, system 100 may implement a plurality of redundant storage interfaces 126, as shown in FIG. 1.

Disk drive backplane 128 may comprise any system, device, or apparatus configured to interconnect modular storage interfaces 126 with modular disk drives 130. Accordingly, disk drive backplane 128 may include slots and/or connectors configured to receive storage interfaces 126 and/or disk drives 130. In some embodiments, system 100 may include two or more backplanes, in order to support differently-sized disk drive form factors. To support redundancy and high availability, a backplane 128 may be configured to receive a plurality (e.g., two) of storage interfaces 126 which couple two storage controllers 114 to each disk drive 130.

Each disk drive 130 may include computer-readable media (e.g., magnetic storage media, optical storage media, opto-magnetic storage media, and/or other type of rotating storage media, flash memory, and/or other type of solid state storage media) and may be generally operable to store data and/or programs (e.g., one or more operating systems and/or one or more application programs). Although disk drives 130 are depicted as being internal to chassis 101 in FIG. 1, in some embodiments, one or more disk drives may be located external to chassis 101 (e.g., in one or more enclosures external to chassis 101).

Optical media drive 132 may be coupled to mid-plane 106 and may include any suitable system, apparatus, or device configured to read data from and/or write data to an optical storage medium (e.g., a compact disc, digital versatile disc, blue laser medium, and/or other optical medium). In certain embodiments, optical media drive 132 may use laser light or other electromagnetic energy to read and/or write data to an optical storage medium. In some embodiments, optical media drive 132 may be nonshared and may be user-configurable such that optical media drive 132 is associated with a single information handling system 102.

KVM interface 134 may be coupled to mid-plane 106 and may include any suitable system, apparatus, or device configured to couple to one or more of a keyboard, video display, and mouse and act as a switch between multiple information handling systems 102 and the keyboard, video display, and/or mouse, thus allowing a user to interface with a plurality of information handling systems 102 via a single keyboard, video display, and/or mouse.

User interface 136 may include any system, apparatus, or device via which a user may interact with system 100 and its various information handling resources by facilitating input from a user allowing the user to manipulate system 100 and output to a user allowing system 100 to indicate effects of the user's manipulation. For example, user interface 136 may include a display suitable for creating graphic images and/or alphanumeric characters recognizable to a user, and may include, for example, a liquid crystal display, cathode ray tube, a plasma screen, and/or a digital light processor projection monitor. In certain embodiments, such a display may be an integral part of chassis 101 and receive power from power supplies (not explicitly shown) of chassis 101, rather than being coupled to chassis 101 via a cable. In some embodiments, such display may comprise a touch screen device capable of receiving user input, wherein a touch sensor may be mechanically coupled or overlaid upon the display and may comprise any system, apparatus, or device suitable for detecting the presence and/or location of a tactile touch, including, for example, a resistive sensor, capacitive sensor, surface acoustic wave sensor, projected capacitance sensor, infrared sensor, strain gauge sensor, optical imaging sensor, dispersive signal technology sensor, and/or acoustic pulse recognition sensor. In these and other embodiments, user interface 136 may include other user interface elements (e.g., a keypad, buttons, and/or switches placed in proximity to a display) allowing a user to provide input to system 100. User interface 136 may be coupled to chassis management controllers 112 and/or other components of system 100, and thus may allow a user to configure various information handling resources of system 100 (e.g., assign individual information handling systems 102 to particular information handling resources).

When a system (e.g., system 100) is architected so as to allow information handling resources (e.g., PCIe adapters coupled to slots 120) to be located in a chassis having shared resources such that the information handling resources may be assigned to one information handling system or shared among a plurality of information handling resources, challenges may arise when needing to service an information handling resource.

Shared resources or devices, such as PCIe adapters coupled to slots 120, may be virtualized across multiple information handling systems 102. Non-shared resources or devices may be partitioned such that they are visible only to a single information handling system 102 at a time. Chassis management controller 112 may be configured to handle routing and switching through switches 110 to affect sharing of a resource to multiple information handling systems 102 or to affect dedicated assignment of a resource to a single information handling system 102.

Figure 2:
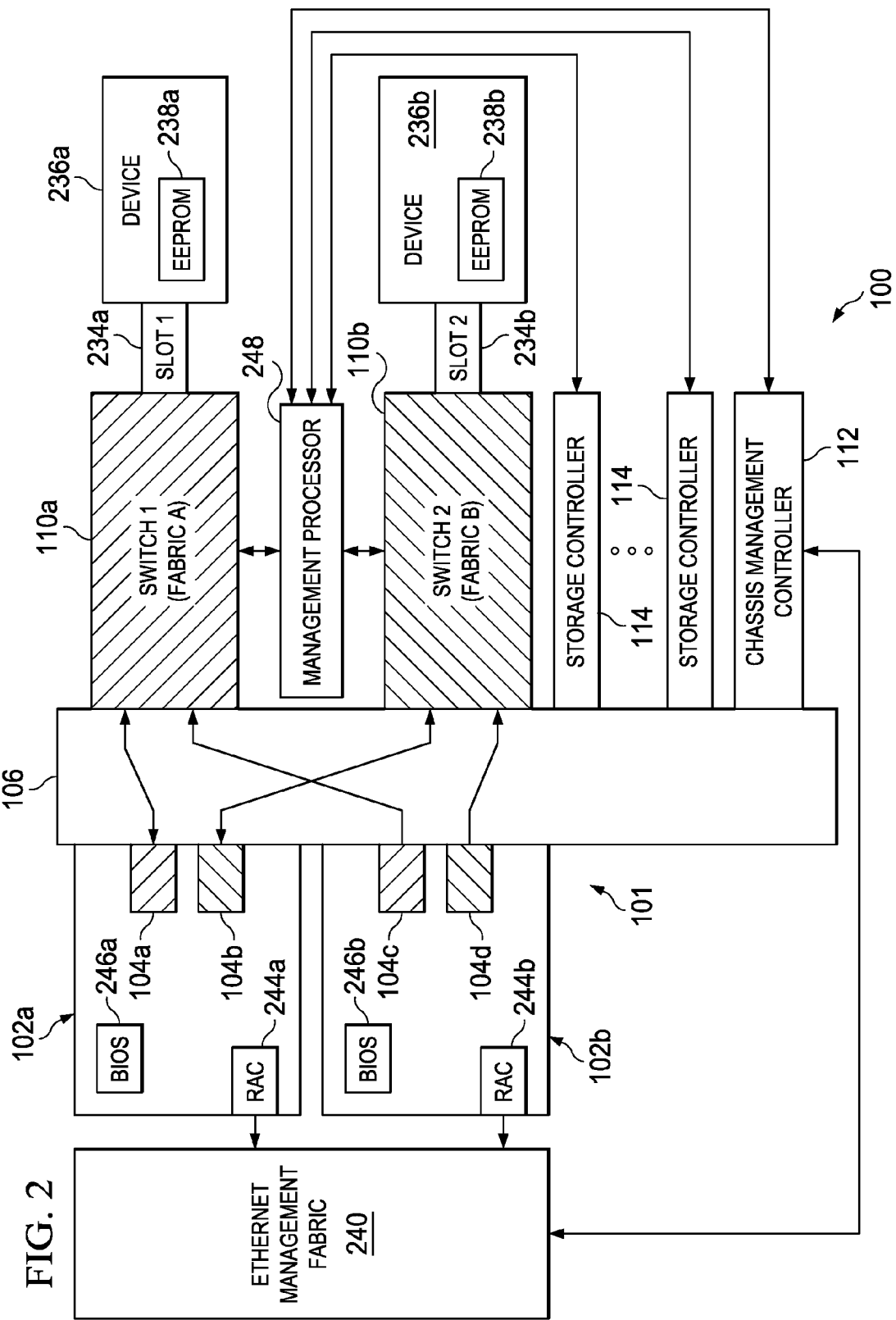
FIG. 2 illustrates a more detailed block diagram of an example system configured for switches and devices in a multi-root I/O virtualization environment for multiple information handling systems, in accordance with embodiments of the present disclosure.

FIG. 2 illustrates a more detailed block diagram of example system 100 configured for switches and devices in a multi-root I/O virtualization ("IOV") environment for multiple information handling systems 102 in accordance with embodiments of the present disclosure.

As shown in FIG. 2, chassis 101 may include a management processor 248 communicatively coupled to one or more of chassis management controller 112 and switches 110. Management processor 248 may be any system, device, or apparatus configured to facilitate management and/or control of switches 110. Management processor 248 may be configured to issue commands and/or other signals to switches 110. Management processor 248 may comprise a microprocessor, microcontroller, DSP, ASIC, EEPROM, or any combination thereof. In one embodiment, management processor 248 may run a Linux operating system and include application-programming-interfaces ("APIs") for supporting configuration of IOV in system 100 for sharing devices connected to slots 234 of chassis 101 to multiple information handling systems 102. The APIs of management processor 248 may provide the interface to chassis management controller 112 for configuring IOV. Management processor 248 may be configured to manage both switches 110. In one embodiment, management processor 248 may be communicatively coupled to an Ethernet management fabric 240 and to information handling systems 102. In another embodiment, chassis management controller 112 may be communicatively coupled to the information handling systems 102 through Ethernet management fabric 240. Chassis management controller 112 may be directly communicatively coupled to the Ethernet management fabric 240 or through, for example, management processor 248.

Although FIG. 2 depicts management controller 248 operable to facilitate management and/or control of switches 110, in some embodiments of the present disclosure, one or more chassis management controllers 112 may be configured to perform the functionality of management processor 248, in which a management processor 248 independent of the chassis management controllers 112 may not be present.

Chassis 101 may include multiple information handling systems 102. Chassis 101 may include any suitable number of information handling systems 102. In some embodiments, information handling systems 102 may be referred to as "blades".

Each information handling system 102 may include switch interfaces 104, as described in association with FIG. 1. Information handling systems 102 may include a basic input-output system 246 ("BIOS") which may be implemented, for example, on firmware for execution by the information handling system. Information handling system 102 may access BIOS 246 upon, for example, start-up of information handling system 102 to initialize interoperation with the rest of chassis 101.

Information handling system 102 may include a remote access controller 244. Remote access controller 244 may be implemented by, for example, a microprocessor, microcontroller, DSP, ASIC, EEPROM, or any combination thereof. Remote access controller 244 may be configured to communicate with one or more of chassis management controller 112 and management processor 248. Such communication may be made, for example, through Ethernet management fabric 240. Remote access controller 244 may be configured to provide out-of-band management facilities for management of information handling system 102. Such management may be made by elements of chassis 101 even if information handling system 102 is powered off or powered to a standby state. Remote access controller 244 may include a processor, memory, and network connection separate from the rest of information handling system 102. In certain embodiments, remote access controller 244 may include or may be an integral part of a baseboard management controller (BMC), Dell Remote Access Controller (DRAC) or an Integrated Dell Remote Access Controller (iDRAC). Remote access controller 244 may be communicatively coupled to BIOS 246.

Switches 110 may contain PCIe cards instead of the typical blade Ethernet, Fibre Channel or InfiniBand cards. Switch interfaces 104 of the information handling systems 102 may couple to switches 110 through the switch interfaces 104 of switches 110. Switches 110 may couple information handling systems 102 to slots 234. Slots 234 may include one or more of the slots 120 of FIG. 1 in any suitable combination.

In one embodiment, each of information handling systems 102 may be communicatively coupled to each of switches 110 through one of switch interfaces 104 resident on the information handling system 102. For example, information handling system 102a may be communicatively coupled to switch 110a through switch interface 104a and to switch 110b through switch interface 104b. Information handling system 102b may be communicatively coupled to switch 110a through switch interface 104c and to switch 110b through switch interface 104d. Thus, each of switches 110 may provide its switching fabric to each of information handling systems 102 in order to route the given information handling system 102 to respective slots 234 associated with the switch 110.

Slots 234 may be configured to couple to associated devices 236, though fewer devices may be present than the associated capacity of chassis 101. Chassis 101 may include any suitable number of slots 234. In some embodiments, devices 236 may include PCIe-based cards or devices. Each such device 236 may represent an information handling resource to be selectively shared among multiple information handling systems 102 or dedicated to a single information handling system 102. A device 236 may comprise, for example, a RAID controller, network card, or other information handling resource. Furthermore, a device 236 may include a specific shared component such as a NIC. Devices 236 may include management information or circuitry configured to provide information to chassis 101 regarding the operation or specification of device 236. For example, a device 236 may include EEPROM 238 containing such information.

In order to support IOV, the driver and firmware of device 236 may include support for single root IOV (SR-IOV). To maintain routes between given information handling systems 102 and slots 234, switches 110 may include virtual hierarchies from slots 234 to information handling systems 102. Particular functions, such as virtual functions or shared functions, for SR-IOV for a given device 236 may be mapped in switch 110, providing behavior similar to multiple-root IOV (MR-IOV). Thus, in such case, a switch 110 may be considered a Multi-Root Aware (MRA) switch which bridges MR-IOV to SR-IOV so that SR-IOV virtual functions may be exposed to a mode as physical function, such that an information handling system 102 is not aware that a given device 236 is shared. In one embodiment, wherein device 236 contains multiple information handling resources such as a NIC and USB interface, a function may be provided for each such information handling resource. Thus, from the perspective of information handling systems 102 such multiple information handling resources may appear to be separate and unrelated. A given slot 234 or device 236 which has been virtualized may be accessed by two or more virtual functions, which allows the sharing of the resource. Physical functions, as opposed to the above-described virtual functions or shared functions, may be mapped or stored in management processor 248. A physical function representing an information handling resource may be provided to a single information handling system 102. In cases where a device 236 contains multiple information handling resources, individual physical functions may be provided for each such resource. Multiple instances of a virtual function may be provided to multiple information handling systems 102. If, for example, multiple information handling systems 102 are sharing a device 236, then access to device 236 may be divided into multiple virtual NICs using virtual functions, each of which are mapped by switches 110 to the respective information handling system 102. Furthermore, specific APIs for accessing a given device 236 may be mapped or stored in management processor 248. Chassis management controller 112 may be configured to access these physical functions or APIs in management processor 248.

In some embodiments of system 100, many devices 236 of the same or similar functionality may be coupled to slots 234. In addition, such devices 236 may be shared among multiple information handling systems 102 or may be dedicated to a single information handling system 102. When a device 236 is shared among multiple information handling systems 102, and such device 236 becomes degraded (e.g., fails or becomes overused beyond its capacity), such degradation can result in loss of functionality of one or more of the information handling systems 102 associated with the device 236, all the while a device 236 with the same functionality may be sitting idle or well under capacity in another slot 234. Thus, a mechanism for dynamically allocating devices 236 to information handling systems 102 may be desirable.

Because information handling resources, such as those in devices 236 coupled to slots 234, are not located within an information handling system 102, but rather in a shared chassis using switches 110 to virtualize and route I/O communications among selected information handling systems 102, allocation of such information handling resources may not be directly controlled by an associated information handling system 102. Consequently, allocation of information handling resources such as devices 236 with information handling systems 102 in chassis 101 may be conducted by chassis management controller 112. As described in greater detail below, chassis management controller 112 may be configured to allocate or otherwise direct other components of chassis 101 to allocate devices 236 to information handling systems 102. It is noted that while the functionality described herein contemplates virtualization for shared devices 236, the functionality described herein may also be extended to nonshared devices as well.

As shown in FIG. 2, system chassis 101 may include internal switching fabrics (e.g., Fabric A and Fabric B). In the embodiments represented by FIG. 2, Fabric A is associated with switch 110a (labeled "Switch 1") and Fabric B is associated with switch 110b (labeled "Switch 2"). Although not depicted in FIG. 2, storage controllers 114 may each be associated with a particular switching fabric of chassis 101 (e.g., based upon a slot or connectors via which a particular storage controller 114 is coupled to mid-plane 106).

Similarly, to maintain routes between given information handling systems 102 and storage controllers 114, switches 110 may include virtual hierarchies from storage controllers 114 such that particular functions, such as virtual functions or shared functions, for SR-IOV for a given storage controller 114 may be mapped in switch 110, providing behavior similar to MR-IOV. Although not depicted in FIG. 2, storage controllers 114 may each be associated with a particular switching fabric of chassis 101 (e.g., based upon a slot or connector via which a particular storage controller 114 is coupled to mid-plane 106). Thus, similar to devices 236, a given storage controller 114 which has been virtualized may be accessed by two or more virtual functions, which allows the sharing of the resource.

This architecture may allow for high availability and/or data mirroring to disk drives communicatively coupled to devices 236 and storage controllers 114 via two different I/O mechanisms. For example, a storage controller 114 may comprise a RAID storage controller while a device 236 may comprise an iSCSI storage controller coupled to disk drives 130 internal to chassis 101 or other disk drives external and/or remote from chassis 101. As shown in FIG. 3, which depicts a virtual stack 300 for I/O communication between an information handling system 102 and target storage controllers, each of a storage controller 114 and a device 236 which comprises a storage controller may expose virtual functions to management processor 248. For example, the virtual function of storage controller 114 may expose a virtual disk and/or logical unit of a storage resource to management processor 248, while the virtual function of device 236 may expose an iSCSI host bus adapter (HBA) to management processor 248. Management processor 248 may mirror the two virtual functions and expose a single resulting virtual function to a switch 110, thus providing a communications pathway between the single resulting virtual function and one or more information handling systems 102. I/O communicated from an information handling system 102 to management processor 248 may be communicated to each of the mirrored virtual functions associated with storage controller 114 and device 236.

In order to write data to the mirrored storage controller 114 and device 236, a write request may be communicated from an information handling system 102 to management processor 248 via a switch 110. Management processor 248 may duplicate the write request, sending the request to mirrored virtual functions for each of a device 236 and a storage controller 114. Once the individual write requests have completed, each of storage controller 114 and device 236 may communicate an acknowledgement to the management controller via their respective virtual functions. Once each acknowledgement has been received, management processor 248 may communicate an acknowledgment of completion to the information handling system 102 originating the write request, again via a switch 110 and the virtual function exposed by management processor 248 to such switch 110.

As for a read request, the read request may be communicated from an information handling system 102 to management processor 248 via a switch 110. In some embodiments, management processor 248 may divide the read request into two parts (e.g., forming two separate read requests seeking different portions of the data responsive to the read request), communicating one part to each of a device 236 and a storage controller 114. Each of storage controller 114 and device 236 may respond to management processor 248 (e.g., via their respective mirrored virtual functions) with data responsive to the part of the read request communicated to it. Management processor 248 may combine the data received from device 236 and storage controller 114 and communicate such data to the information handling system 102 originating the read request, again via a switch 110 and the virtual function exposed by management processor 248 to such switch 110.

In an alternative embodiment, the read request may not be divided into two parts by management processor 248, and instead, management processor 248 will forward the read request to one of storage controller 114 or device 236, not both. For example, during normal operation, read requests may be forwarded from management processor 248 to storage controller 114, and read requests may be forwarded from management processor 248 to device 236 only when storage controller 114 experiences a failure condition.

Alternatively to the communication stack shown in FIG. 3, high availability and/or data mirroring may also be accomplished by mirroring communications on two storage controllers 114. To that end, FIG. 4 depicts another virtual stack 400 for I/O communication between an information handling system 102 and target storage controllers 114, wherein each of two storage controllers 114 may expose virtual functions to management processor 248. For example, the virtual functions of storage controller 114 may each expose a respective virtual disk and/or logical unit of a storage resource to management processor 248. Management processor 248 may mirror the two virtual functions and expose a single resulting virtual function to a switch 110, thus providing a communications pathway between the single resulting virtual function and one or more information handling systems 102. I/O communicated from an information handling system 102 to management processor 248 may be communicated to each of the mirrored virtual functions associated with storage controllers 114.

In order to write data to the mirrored storage controllers 114, a write request may be communicated from an information handling system 102 to management processor 248 via a switch 110. Management processor 248 may duplicate the write request, sending the request to mirrored virtual functions for each of storage controllers 114. Once the individual write requests have completed, each of storage controllers 114 may communicate an acknowledgement to the management controller via their respective virtual functions. Once each acknowledgement has been received, management processor 248 may communicate an acknowledgment of completion to the information handling system 102 originating the write request, again via a switch 110 and the virtual function exposed by management processor 248 to such switch 110.

As for a read request, the read request may be communicated from an information handling system 102 to management processor 248 via a switch 110. In some embodiments, management processor 248 may divide the read request into two parts (e.g., forming two separate read requests seeking different portions of the data responsive to the read request), communicating one part to each of storage controllers 114. Each of storage controllers 114 may respond to management processor 248 (e.g., via their respective mirrored virtual functions) with data responsive to the part of the read request communicated to it. Management processor 248 may combine the data received from storage controllers 114 and communicate such data to the information handling system 102 originating the read request, again via a switch 110 and the virtual function exposed by management processor 248 to such switch 110.

In an alternative embodiment, the read request may not be divided into two parts by management processor 248, and instead, management processor 248 will forward the read request to one of storage controllers 114, not both. For example, during normal operation, read requests may be forwarded from management processor 248 to a first storage controller 114, and read requests may be forwarded from management processor 248 to a second storage controller 114 only when the first storage controller 114 experiences a failure condition.

Although the present disclosure has been described in detail, it should be understood that various changes, substitutions, and alterations can be made hereto without departing from the spirit and the scope of the disclosure as defined by the appended claims.

What is claimed is:

1. A system comprising:
   a management processor configured to be communicatively coupled to a plurality of information handling systems and further configured to:
   expose a first virtual function instantiated on the management processor to a switch interfaced between an information handling system and the management processor; and
   in response to receiving by the first virtual function an input/output request from the information handling system:
   communicate the input/output request to each of two mirrored virtual functions, the mirrored virtual functions comprising:
   a second virtual function instantiated on a first information handling resource communicatively coupled to the management processor; and a third virtual function instantiated on a second information handling resource communicatively coupled to the management processor;

receive an acknowledgment of completion of the input/output request from each of the second virtual function and the third virtual function; and communicate the acknowledgement to the information handling system via the switch and the first virtual function.

2. The system of claim 1, the switch comprising a Peripheral Component Interconnect Express switch.

3. The system of claim 1, wherein the first information handling resource comprises a Redundant Array of Inexpensive Disks controller and the second information handling resource comprises an Internet Small Computer System Interface controller.

4. The system of claim 1, wherein the first information handling resource comprises a first Redundant Array of Inexpensive Disks controller and the second information handling resource comprises a second Redundant Array of Inexpensive Disks controller.

5. The system of claim 1, wherein the input/output request is a write request.

6. The system of claim 1, wherein the input/output request is a read request.

7. The system of claim 6, wherein:

communicating the input/output request comprises:
dividing the read request into a first part and a second part;
communicating the first part to the second virtual function;
communicating the second part to the third virtual function; and receiving the acknowledgment of completion of the input/output request comprises:
receiving data responsive to the first part of the read request from the second virtual function; and
receiving data responsive to the second part of the read request from the third virtual function.

8. The system of claim 1, wherein the first information handling resource comprises a first storage controller and the second information handling resource comprises a second storage controller.

9. The system of claim 1, wherein the first information handling resource comprises a storage controller and the second information handling resource comprises a network interface card.

10. The system of claim 1, wherein the management processor is configured to be disposed in a chassis configured to receive the plurality of information handling systems, the first information handling resource, and the second information handling resource.

11. A method comprising:

exposing a first virtual function instantiated on a management processor to a switch interfaced between an information handling system and the management processor; and in response to receiving by the first virtual function an input/output request from the information handling system:

communicating, by the management processor, the input/output request to each of two mirrored virtual functions, the mirrored virtual functions comprising:
a second virtual function instantiated on a first information handling resource communicatively coupled to the management processor; and
a third virtual function instantiated on a second information handling resource communicatively coupled to the management processor;

receiving, by the management processor, an acknowledgment of completion of the input/output request from each of the second virtual function and the third virtual function; and communicating, by the management processor, the acknowledgement to the information handling system via the switch and the first virtual function.

12. The method of claim 11, the switch comprising a Peripheral Component Interconnect Express switch.

13. The method of claim 11, wherein the first information handling resource comprises a Redundant Array of Inexpensive Disks controller and the second information handling resource comprises an Internet Small Computer System Interface controller.

14. The method of claim 11, wherein the first information handling resource comprises a first Redundant Array of Inexpensive Disks controller and the second information handling resource comprises a second Redundant Array of Inexpensive Disks controller.

15. The method of claim 11, wherein the input/output request is a write request.

16. The method of claim 11, wherein the input/output request is a read request.

17. The method of claim 16, wherein:

communicating the input/output request comprises:
dividing the read request into a first part and a second part;
communicating the first part to the second virtual function; and
communicating the second part to the third virtual function; and receiving the acknowledgment of completion of the input/output request comprising:
receiving data responsive to the first part of the read request from the second virtual function; and
receiving data responsive to the second part of the read request from the third virtual function.

18. The method of claim 11, wherein the first information handling resource comprises a first storage controller and the second information handling resource comprises a second storage controller.

19. The method of claim 11, wherein the first information handling resource comprises a storage controller and the second information handling resource comprises a network interface card.

20. The system of claim 11, wherein the management processor is configured to be disposed in a chassis configured to receive the information handling system, the first information handling resource, and the second information handling resource.

* * * * *